(12) United States Patent
Isaev

(10) Patent No.: US 12,533,649 B2
(45) Date of Patent: Jan. 27, 2026

(54) METHOD FOR CONVERTING THERMAL ENERGY INTO DISSOCIATION ENERGY OF MOLECULES OF A GAS MEDIUM AND A DEVICE FOR IMPLEMENTING SAME

(71) Applicant: Sun2h AG, Kloten (CH)

(72) Inventor: Alexander Isaev, Vienna (AT)

(73) Assignee: Sun2h AG, Kloten (CH)

( * ) Notice: Subject to any disclaimer, the term of this patent is extended or adjusted under 35 U.S.C. 154(b) by 961 days.

(21) Appl. No.: 17/719,275

(22) Filed: Apr. 12, 2022

(65) Prior Publication Data

US 2023/0321622 A1 Oct. 12, 2023

(51) Int. Cl.
*B01J 6/00* (2006.01)
*B01D 53/32* (2006.01)
*B01J 7/00* (2006.01)
*B01J 19/12* (2006.01)
*C01B 3/04* (2006.01)
(Continued)

(52) U.S. Cl.
CPC ............ *B01J 6/008* (2013.01); *B01D 53/323* (2013.01); *B01J 7/00* (2013.01); *B01J 19/12* (2013.01); *C01B 3/045* (2013.01); *C01B 13/0207* (2013.01); *C09C 1/487* (2013.01)

(58) Field of Classification Search
None
See application file for complete search history.

(56) References Cited

U.S. PATENT DOCUMENTS 3,947,335 A * 3/1976 Marling ................. B01J 19/121
                                                204/157.93
4,071,608 A    1/1978 Diggs
(Continued)

FOREIGN PATENT DOCUMENTS

EA            002240 B1    2/2002

OTHER PUBLICATIONS

European search report for application No. 21 164 315.0 dated Aug. 20, 2021.
(Continued)

*Primary Examiner* — Brian W Cohen
*Assistant Examiner* — Nathanael Jason Downes
(74) *Attorney, Agent, or Firm* — Bachman & LaPointe, P.C.

(57) ABSTRACT

A device (1) and method are claimed for converting thermal energy into dissociation energy of molecules of a gas medium (3). The device incorporates a reaction vacuum chamber (2), designed to enable a gas medium (3) to be supplied therein, at least one thermal radiator (4), of which at least one emission spectral line of a medium (5), in the temperature range 350° C. to 1500° C., at least partially corresponds to the absorption spectral line of molecules of the gas medium (3). At least part of the volume of the vacuum chamber (2) is positioned in the zone of optical visibility of the radiator (4) and is a reaction volume (7) for the gas medium (3), in which reaction volume, as a result of resonance oscillations of molecules of the gas medium (3), excited by the radiator (4), at least partial dissociation of the gas medium (3) takes place. The device also incorporates a system (8) for drawing off at least one product of dissociation of molecules of the gas medium (3).

5 Claims, 3 Drawing Sheets

(51) Int. Cl.
    *C01B 13/02*     (2006.01)
    *C09C 1/48*     (2006.01)

(56) References Cited

U.S. PATENT DOCUMENTS

| | | | |
|---|---|---|---|
| 4,148,701 A * | 4/1979 | Leach | C01B 3/02 |
| | | | 204/157.52 |
| 4,233,127 A | 11/1980 | Monahan | |
| 4,342,738 A | 8/1982 | Burgund | |
| 6,669,827 B2 | 12/2003 | Austin | |
| 7,125,480 B2 | 10/2006 | Austin | |
| 7,384,619 B2 | 6/2008 | Bar-Gadda | |
| 2003/0183505 A1 | 10/2003 | Austin | |
| 2011/0052451 A1 * | 3/2011 | Elkind | C01B 3/042 |
| | | | 422/162 |
| 2016/0129427 A1 | 5/2016 | Velu et al. | |

OTHER PUBLICATIONS

International Search Report and Written Opinion Dated Feb. 22, 2023 for corresponding application PCT/EP2022/067488.

\* cited by examiner

METHOD FOR CONVERTING THERMAL ENERGY INTO DISSOCIATION ENERGY OF MOLECULES OF A GAS MEDIUM AND A DEVICE FOR IMPLEMENTING SAME

BACKGROUND OF THE INVENTION

The invention relates to a device and a method for converting thermal energy into dissociation energy of molecules of a gas medium. The claimed invention can be used, for instance, for the dissociation of water vapour into hydrogen and oxygen, or for the dissociation of carbon dioxide into oxygen and carbon.

Countries around the world are actively seeking new ways to make beneficial use of two of the most commonly available materials: carbon dioxide and water, from which, amongst other things, oxygen and hydrogen are generated.

Hydrogen has a key role to play in the prevention of global warming, and in the power industry of the future, particularly "green hydrogen" produced without carbon dioxide emissions. One of the key problems associated with climate change on Earth is the problem of increasing $CO_2$ levels in the atmosphere, which results in the need to develop alternative methods for reducing levels of $CO_2$ in the atmosphere, correspondingly, to look for ways of breaking down said $CO_2$.

A number of methods for producing hydrogen have been described, for instance coal gasification, steam methane reforming, biomass gasification. A disadvantage of these methods is that carbon dioxide gas is produced as a by-product. A method of water electrolysis, to produce hydrogen and oxygen, is known, but the high power consumption of electrolysis is a serious limitation. A number of methods designed to overcome the shortcomings of electrolysis have already been described.

Documents U.S. Pat. Nos. 7,125,480 and 6,669,827 describe systems and methods for the ultrafast photodissociation of a water molecule at relatively low temperatures (typically 120-210° C.) using energy efficient light sources in the near infrared band. This method requires pre-conditioning of the water being supplied in order to reduce the pH. Also, in order to eliminate the possibility of immediate recombination of the products of dissociation, radiolysis is used, wherein the dissociated H and O components are bombarded with ionising radiation at a radio frequency designed to suppress the recombination of said components.

Document EA002240 B1 discloses a process for producing hydrogen from water, which process includes: the heating of water up to the dissociation temperature of same, to produce a reaction mixture of dissociated water containing gaseous oxygen and gaseous hydrogen; the generation, in the reaction mixture, of a vortex which subjects this reaction mixture to the action of centrifugal forces, in such a way that radial stratification of the gaseous hydrogen and gaseous oxygen occurs in the internal volume of the aforementioned reactor; and the extraction of gaseous hydrogen from this reaction mixture. This method provides for the heating of the mixture, up to water dissociation temperatures of between approximately 1800° C. and approximately 3000° C., which makes it a comparatively energy-demanding process.

Document U.S. Pat. No. 4,071,608 describes the use of solar energy to generate water vapour and the subsequent thermal dissociation of molecules of said water vapour, after which, the hydrogen and oxygen resulting from dissociation are separated using centrifugal force. In the proposed method, significant parts of hydrogen and oxygen, resulting from dissociation, recombine with each other to form water vapour, which significantly reduces the efficiency of this method.

Document U.S. Pat. No. 7,384,619 discloses the dissociation of water vapour by passing through plasma. This method, however, requires a complex process equipment set-up.

SUMMARY OF THE INVENTION

There is still a demand for the development of alternative cost-effective methods for the dissociation of a gas medium using other, more efficient types of energy, which are, for example, an unwanted product in many production processes.

The proposed invention makes it possible to avoid the above-mentioned shortcomings, by providing an alternative cost-effective method for the dissociation of a gas medium, making more efficient use of the energy used to dissociate the gas medium, which energy can be, for instance, solar radiation energy or other forms of thermal energy which are an unwanted product in many production processes.

The aim of the present invention is to provide a device and a method for converting thermal energy into dissociation energy of molecules of a gas medium, with an increased, compared to the known prior art, utilisation efficiency of this energy for the dissociation of a gas medium, while at the same time minimising the recombination of products of dissociation of the gas medium.

This problem is addressed using the device and the method for converting thermal energy into dissociation energy of molecules of a gas medium, according to the independent claims. The preferred embodiments of the present invention are presented in the dependent claims.

It is a known fact that gases emit and absorb energy, in the form of photons, only at certain frequencies. The absorption and emission of energy occurs at frequencies which resonate with the oscillation frequency of atoms in a molecule, which is used, for instance, in infrared spectroscopy. It is also a known fact that if a sufficient quantity of energy is absorbed, a molecule can dissociate, in other words the bond energy between atoms in a molecule is disrupted.

In order for the oscillation energy, sufficient for dissociation, to build up in a molecule and not to be passed to adjacent molecules of a gas or a vapour when colliding with same, it is vital to minimise collisions between these molecules, in other words, to establish a rarefied pressure of the gas or the vapour. For this reason, the claimed device, for converting thermal energy into dissociation energy of molecules of a gas medium, has a reaction vacuum chamber designed to enable a gas medium to be supplied therein and to maintain a pressure therein which is below atmospheric pressure. Based on the results of conducted experiments, it was established that the process of dissociation of molecules of a gas medium occurs most efficiently when such a rarefied gas medium, is subjected to targeted irradiation by resonance frequencies of a radiator, in a temperature range of between 350° C. and 1500° C., which corresponds to a wavelength range of 4.65-1.64 microns. To this end, the proposed invention uses at least one radiator, of which at least one emission spectral line of a medium, in the indicated temperature range, at least partially corresponds to the absorption spectral line of the molecules of the gas medium. A selective absorption spectrum of a gas medium consists of a plurality of lines which form absorption bands, also known as absorption spectral lines of molecules of a gas medium, separated by sections ("windows") inside which, effectively, energy from the radiator is not absorbed. Absorption of thermal energy from the radiator, in the absorption spectral lines of the molecules of gas medium, takes place with an intensity which is hundreds of times greater than in the spectrum windows. It is a known fact that absorption spectral lines form when radiation passes through a comparatively cold gas medium. Therefore, irradiating a gas medium at below-atmospheric pressure in a reaction vacuum chamber, using energies which correspond to the absorption spectral lines of molecules of the gas medium, promotes the maximum transfer of energy from the radiator to the gas medium, without the need to irradiate the gas medium, and also the walls of the reaction vacuum chamber, using energies corresponding to the above-mentioned spectrum windows, said energies being expended solely on the 'parasitic' heating of the walls of the reaction vacuum chamber. To enable the dissociation of a gas medium to be carried out, at least a part of the volume of the vacuum chamber, being the reaction volume for the gas medium, must be positioned in the zone of optical visibility of the radiator, wherein, dissociation of the gas medium occurs in the reaction volume as a result of resonance oscillations of the molecules of the gas medium, excited by the radiator. Intermediate and/or final products of dissociation of the molecules of the gas medium are drawn off from the vacuum chamber by a draw-off system. An important feature of the claimed device is the significant reduction in recombination of products of dissociation of the molecules of the gas medium within the vacuum chamber, by virtue of the establishment of a lower pressure of the gas medium, i.e. a pressure which is lower than atmospheric pressure. This can be achieved by any known method, for instance by connecting up an evacuation pump which allows the pressure of the gas medium to be maintained in a range between $10^{-5}$ mbar and 500 mbar, preferably in a range between $10^{-3}$ mbar and 50 mbar. The establishment of a rarefied gas medium in the reaction vacuum chamber makes it possible, within the molecules of the gas medium, to accumulate oscillation energy absorbed from a radiator, said accumulated energy being sufficient for the dissociation of molecules of the gas medium by minimising collisions between individual molecules of the gas medium.

Any gas which undergoes dissociation in the aforementioned conditions can be used as the gas medium being subjected to dissociation, for example, $CO_2$. So, in the case of $CO_2$ dissociation, this gas medium breaks down into oxygen and carbon, wherein the carbon will precipitate as a deposit onto the bottom of the reaction vacuum chamber, from where said carbon can be drawn off, for instance, along a funnel-shaped channel, while the oxygen will be drawn off along a separate gas draw-off channel. The present invention will be reviewed hereafter as applied to the dissociation of water vapour as the gas medium, wherein, the end products of dissociation of the water vapour are oxygen and hydrogen.

According to one of the embodiments of the claimed invention, the device has, in addition, a system for separating products of dissociation of a gas medium.

In the case of dissociation of water vapour, absorption lines having wavelengths of 2.68 and 2.73 μm can be used as examples of absorption spectral lines of water vapour molecules. These resonance frequencies of atom oscillations in a molecule of water, according to Wien's Law, correspond to the maximum value of radiation at temperatures of around 790° C. and 810° C. Therefore, according to one of the embodiments of the proposed invention, in order to irradiate water vapour present in a reaction chamber at these wavelengths, any heated solid body can be used as a radiator medium, the maximum value of thermal radiation of which is positioned in close proximity to the emission lines at temperatures of 790° C. and 810° C., while an optical filter, which primarily allows radiation corresponding to at least one above-mentioned absorption spectral line of water vapour to pass through, is positioned between the radiator medium and the reaction volume.

In the preferred embodiment of the invention, the radiator has a tank filled with the radiator heated medium which includes a medium with the same chemical composition as the gas medium supplied to the reaction vacuum chamber, in this case water vapour. Furthermore, the reaction volume is at least partially positioned in the zone of optical visibility of the radiator heated medium. In this embodiment of the invention there is no need to position the optical filter, which primarily allows radiation corresponding to at least one above-mentioned absorption spectral line of gas medium to pass through, since the water vapour contained in the radiator tank, which water vapour is heated to a temperature of 800° C., 900° C. or 1000° C., has in effect the same spectral emission lines as the absorption lines of the molecules of water vapour in the reaction vacuum chamber. Therefore, practically all of the energy which goes to heat the water vapour in the radiator tank, is radiated, in effect, at the same frequencies at which the water vapour in the reaction vacuum chamber most effectively absorbs energy. Dissociation of the water vapour into oxygen and hydrogen takes place in the vacuum chamber, as a result of these resonance oscillations of water vapour molecules, excited by the radiator, in the vacuum chamber.

In order to increase the density of the energy reaching the reaction volume, according to another embodiment of the invention, a focussing device is installed for the purpose of focussing the radiation from the radiator into the reaction volume. A lens or a system of lenses, or a mirror or a system of mirrors, or a combination thereof, can be used as the focussing device. According to one of the embodiments, the focussing device is positioned between the radiator and the reaction volume.

According to another embodiment of the proposed invention, the radiation from the radiator medium is beamed radiation, the optical axis of which passes through the reaction volume, wherein a concave reflector is positioned on this optical axis, on the opposite side, relative to the reaction volume, from the radiator medium, said reflector concentrating radiation from the radiator medium into the reaction volume. This arrangement makes it possible, in addition to focussing radiation with the above-mentioned focussing device, or without same, to concentrate radiation from the radiation medium into the reaction volume, having increased the degree of dissociation of molecules of gas medium present in the reaction volume, as well as preventing additional heating of the walls of the reaction vacuum chamber.

According to another embodiment of the invention, both systems, for drawing off and for separating the products of dissociation, are in the form of hollow tubular electrodes spatially separated from each other in a vacuum chamber, said electrodes being connected up to gas draw-off channels which are at a lower pressure than the pressure in the reaction vacuum chamber. In order to ensure electrostatic separation of the products of dissociation of the gas medium, for instance, water vapour, a source of direct-current voltage is connected up to the hollow electrodes. Furthermore, hydrogen is evacuated through one tubular electrode, to which electrode a negative direct-current voltage, relative to the other electrode, is applied, while oxygen is evacuated through the other tubular electrode, to which electrode a positive voltage, relative to the other electrode, is applied. Furthermore, in the course of dissociation of the gas medium, specifically water vapour, the chemical bond between the water molecules is broken and positively charged hydrogen ions and negatively charged OH groups form, said ions and groups being attracted, respectively, to the negatively charged and to the positively charged electrodes, thereby transferring corresponding charges to these electrodes. This makes it possible, along with dissociation of water vapour, to simultaneously generate electricity on the electrodes.

One other embodiment of the claimed invention makes it possible to polarise the molecules of a gas medium in a reaction volume, during the dissociation of said molecules, using additional high-voltage electrodes positioned along both sides of the reaction volume and connected up to a high-voltage source of direct current. Polarisation of the molecules of the gas medium makes it possible to orient these molecules correspondingly, relative to the high-voltage electrodes, the electrical field of which is codirectional with the electrical field of the hollow tubular electrodes, increasing the efficiency of the process of dissociation of the gas medium and diminishing the process by which products of dissociation recombine with each other.

According to another embodiment, the reaction vacuum chamber is equipped with a cooling system, making it possible to draw off undissociated vapour which may condense on the walls of the chamber. Preferably, cooling is carried out using a flow of water, flowing through the tubular elements which have heat-transmitting contact with the walls of the vacuum chamber. As a result of the walls of the vacuum chamber being cooled, the gas medium which does not undergo dissociation, in this case water vapour, condenses on the inner walls of the chamber, runs down said walls into the bottom part of the chamber and can be drawn off, either separately, or together with the medium evacuated by the pump maintaining a reduced pressure in the vacuum chamber. In this way, cooling of the walls of the vacuum chamber helps to establish and maintain additional reduced pressure, i.e. additional vacuum in the vacuum chamber.

According to another embodiment of the proposed invention, the radiator tank, filled with radiator heated medium, has a means for heating the radiator heated medium. This can be either solar radiation, or a heating element. As a means of heating, it is also possible to use a supply of thermal energy generated during operation of an internal combustion engine, or a heating system which operates by passing an electrical current through a heating element, as well as any thermal energy. Preferably the radiator tank has the means to pressurise the radiator heated medium up to a pressure above atmospheric pressure, preferably between 5 and 100 atmospheres, and most preferably, between 10 and 50 atmospheres. Raising the pressure of the radiator heated medium significantly increases the radiant power of the heated medium.

One other embodiment of the invention which uses a radiator tank filled with a radiator heated medium containing a medium with the same chemical composition as the gas medium supplied to the reaction vacuum chamber, involves the positioning of a means for injecting the radiator heated medium into the reaction vacuum chamber, which means connects the radiator tank to the volume of the reaction vacuum chamber. In this embodiment, the injection device is used as a means of supplying a flow of gas medium to the reaction vacuum chamber, wherein the radiator heated medium is the gas medium which undergoes dissociation in the reaction vacuum chamber. The passage opening of the injection device is selected in a range of between 50 μm and 1000 μm, preferably between 100 μm and 500 μm. This enables the design of the device to be significantly simplified, while using a medium, as the radiator heated medium, which has the same composition as the gas medium being subjected to dissociation in the vacuum chamber.

In each of the above-mentioned embodiments of the invention, it is possible to position one reaction vacuum chamber, surrounded by a plurality of, at least two, radiators (not shown), making it possible to increase the efficiency of dissociation of the gas medium by virtue of the multiple increase in the power of thermal radiation supplied into the reaction volume from several radiators simultaneously.

A method is also claimed for converting thermal energy into dissociation energy of molecules of a gas medium, which method includes the provision of a gas medium, supply of same into a reaction volume of at least one vacuum chamber, where said gas medium is subjected to the influence of a radiator, at least one emission spectral line of which, in the temperature range 350° C. to 1500° C., at least partially corresponds to the absorption spectral line of molecules of the gas medium. During the process of dissociation of molecules of the gas medium, at least one product of dissociation is drawn off. The present method can use the previously described embodiments of the device for converting thermal energy into dissociation energy of molecules of a gas medium.

In the preferred embodiment of the method, the radiator heated medium, which contains a medium with the same chemical composition as the gas medium supplied to the reaction vacuum chamber, is supplied to a radiator equipped with a tank. A prerequisite for implementing the process is the positioning of the reaction volume at least partially in the zone of optical visibility of the radiator heated medium which is maintained at a temperature of 350° C.-1500° C.

The claimed method makes it possible to conduct the process of dissociation of, for instance, carbon dioxide or water vapour, or equally, any other gas medium which is capable of dissociation under the indicated conditions of the gas medium.

According to one other embodiment of the method, at the stage when at least one product of dissociation is being drawn off, separation of at least one product of dissociation is carried out with the aid of hollow tubular electrodes spatially separated from each other in the vacuum chamber, said electrodes being connected up to gas draw-off channels which are at a lower pressure than the pressure in the reaction vacuum chamber. At the same time, a source of direct-current voltage is connected up to the hollow electrodes to ensure electrostatic separation of the products of dissociation of the gas medium.

The claimed device and method can be used in one of the following applications: for use in autonomous refuelling/charging stations to receive, store and fill up/charge with hydrogen and electricity; for use in solar concentrators, in which solar heat heats a radiator medium, the radiation from which medium is in turn used for the dissociation of water, resulting in the liberation of hydrogen, for storage of energy and/or conversion of same into electricity; in internal combustion engines and electric vehicles, for the conversion of excess heat for the heating of a radiator medium and ultimately to produce hydrogen; in electricity-generating power stations operating on various types of fuel; in the operation of high-temperature solid oxide fuel cells, including for the recycling of generated heat and water vapour; for the recycling of heat in various production processes; for producing hydrogen; for producing carbon black and oxygen from carbon dioxide; for converting electrical energy into radiant energy of a radiator medium and ultimately for producing hydrogen from water vapour, and by doing so, storing energy in the form of liberated hydrogen.

DETAILED DESCRIPTION

Figure 1:
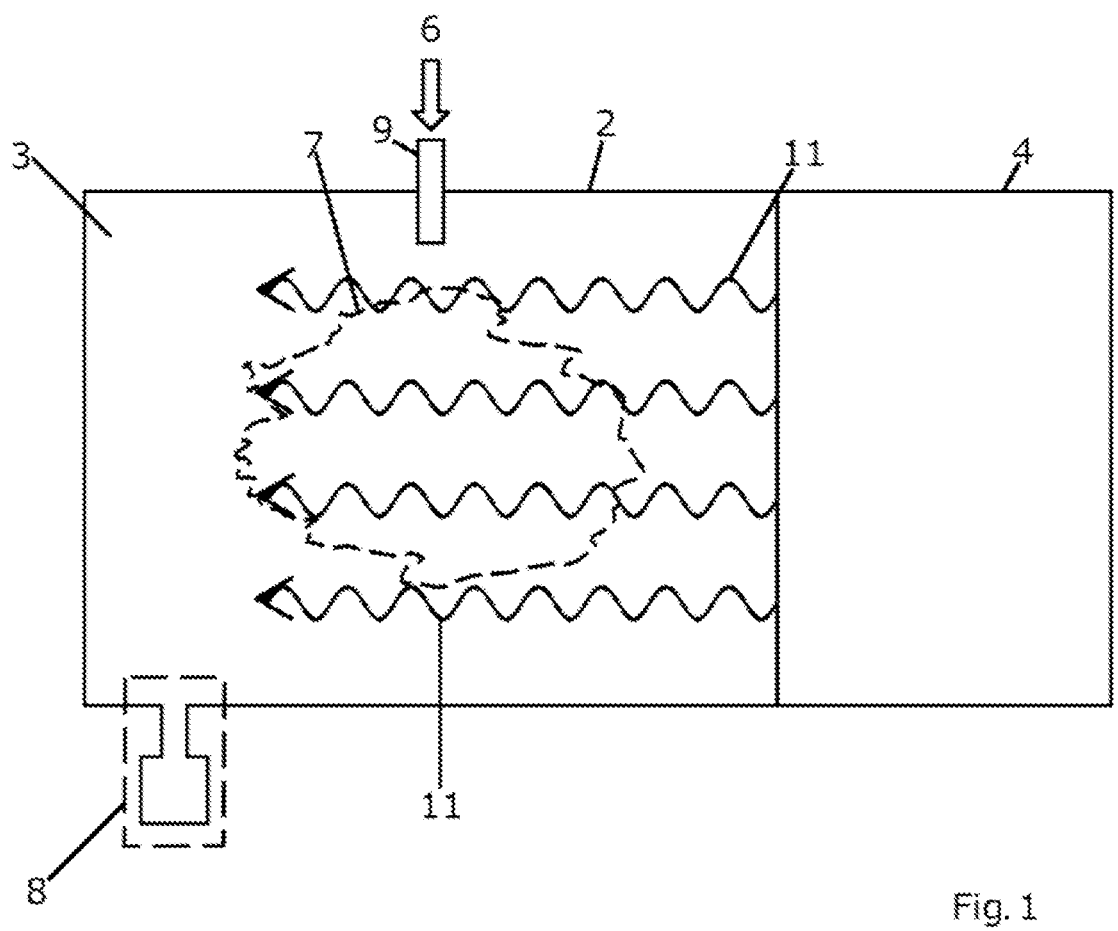
FIG. 1— basic functional diagram of the claimed device.

FIG. 1 is a basic functional diagram illustrating the operation of the device for converting thermal energy into dissociation energy of molecules of a gas medium. The device is a reaction vacuum chamber 2, into which, via an inlet channel 9, a gas medium 3, to be subjected to dissociation, is supplied. The supply of a flow of gas medium is notionally designated by arrow 6 in FIG. 1. A radiator 4, which radiates thermal energy in the range 350° C. to 1500° C., is notionally depicted in the right-hand section of the chamber 2. The thermal energy radiated by the radiator 4 is notionally depicted as a wavy line 11 in FIG. 1. A prerequisite is that at least one emission spectral line of the radiator 4, in the temperature range 350° C. to 1500° C., at least partially corresponds to the absorption spectral line of the molecules of the gas medium 3 present in the vacuum chamber 2. Another prerequisite is the positioning of at least a part of the volume of the vacuum chamber 2, containing the gas medium 3, in the zone of optical visibility of the radiator 4. This area in the zone of optical visibility is notionally designated by line 7 in FIG. 1, however, in the preferred embodiment of the invention, the reaction volume 7 expands to fill virtually the entire internal volume of the reaction vacuum chamber 2, into which the radiation 11 of radiator 4 enters. In the reaction volume 7, by virtue of the resonance oscillations of molecules of the gas medium 3, excited by the radiator 4, as described above, dissociation of the gas medium into individual products of dissociation occurs, said products of dissociation being drawn off from the chamber 2 by a system 8 for drawing off at least one product of dissociation, which system is notionally shown in FIG. 1.

Figure 2:
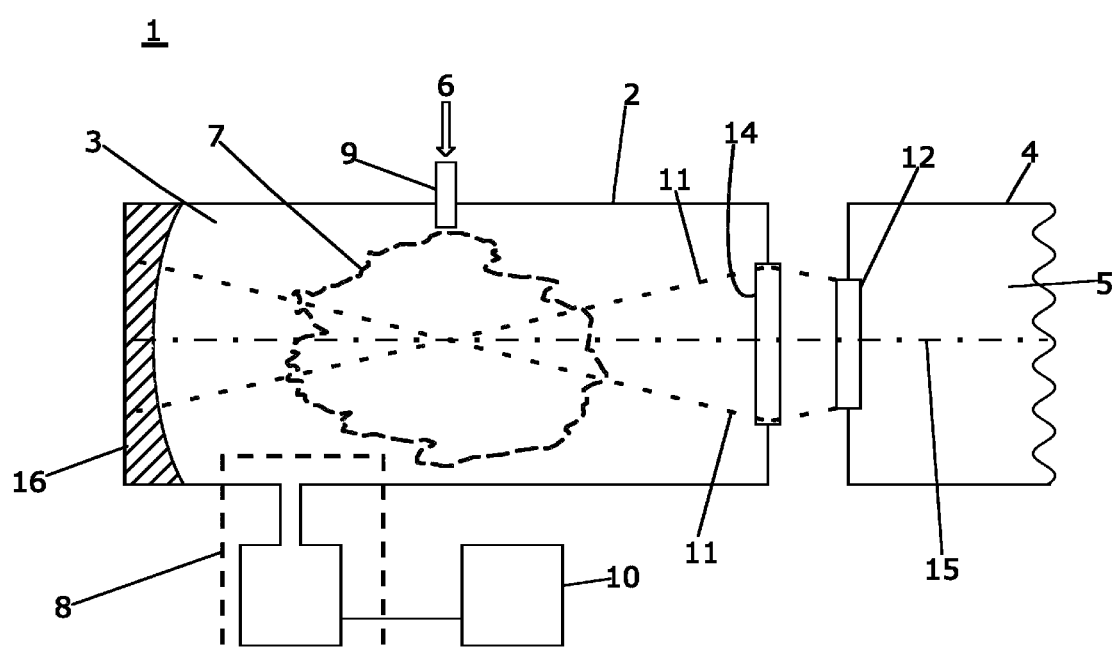
FIG. 2—basic functional view of one of the embodiments of the claimed device.

FIG. 2 depicts one of the possible embodiments of the device for converting thermal energy into dissociation energy of molecules of a gas medium. The device 1 incorporates a reaction vacuum chamber 2 which has a cylindrical gas impermeable housing made of steel. The chamber 2 may be of a different shape and the chamber walls may be of a different material. An inlet channel 9 is provided in the central part of the cylindrical wall of the chamber 2 for the supply of the gas medium 3 to the chamber 2. The direction of supply of the gas medium to inlet channel 9 is schematically depicted by the arrow 6. The outlet port of the inlet channel 9, said outlet port being positioned on the inside of the chamber 2, has a diameter of 200 μm. The outlet port may have a diameter of between 50 and 1000 μm. Additionally, the outlet port may be in the form of an atomiser, or a divergent nozzle. The vacuum chamber 2 is designed with the ability to maintain therein a below-atmospheric pressure, in a range between $10^{-5}$ mbar and 500 mbar, preferably in a range between $10^{-3}$ mbar and 50 mbar, by means of an evacuation pump (not shown) connected up to the chamber 2. The system 8, for drawing off at least one product of dissociation of molecules of the gas medium 3, is positioned in the bottom part of the chamber 2. The draw-off system 8 can be placed in any position in the chamber 2, and said position is determined by the products of dissociation of molecules of the gas medium 3. For instance, when carbon dioxide is dissociated into oxygen and carbon, the carbon being precipitated as a deposit in the bottom part of the chamber 2 can be drawn off by the system for drawing off carbon, at the same time as the system for drawing off oxygen could be positioned in the top part of the chamber (not shown). Henceforth, operation of the device will be shown using the example of dissociation of water vapour. A system 10, for separating products of dissociation of the gas medium 3, is connected up in series to the draw-off system 8, in which separation system a mixture of hydrogen and oxygen are separated using known methods for separating one gas fraction from another, for instance by subjecting said mixture to the action of centrifugal forces. The separation system 10 is depicted schematically in FIG. 1 and is optional for the claimed device.

The radiator 4, which has a radiation medium 5, is depicted schematically in the right-hand section of FIG. 2. The heated radiation medium 5 radiates thermal energy, in the range 350° C. to 1500° C., in a flow designated in FIG. 2 as a dashed line 11, running in the direction of the chamber 2, through an optical filter 12, along the radiation flow axis 15. The optical filter 12 is fitted in the left-hand part of the radiator, between the radiator itself and the chamber 2, and is made of sapphire ($Al_2O_3$), said optical filter could, for instance, be a suitable band-pass filter supplied by the company Edmunds Optics. A focussing device 14 is fitted in the right-hand end part of the chamber 2, in the wall thereof, coaxially to the radiation flow axis 15 of the radiator 4, in order to focus the radiation 11 of the radiator 4 towards the reaction volume 7. The focussing device 14 is a lens manufactured from a material which allows at least one emission spectral line of the radiator, in the temperature range 350° C. to 1500° C., to pass through, said emission spectral line at least partially coinciding with the absorption spectral line of the molecules of the gas medium 3. The material of the focussing device 14 can be the same as the material of the optical filter 12. The presence of the focussing device 14 is optional. In order to further intensify irradition of the reaction volume 7 using the radiation 11 of the radiator 4, a concave reflector 16, which concentrates the radiation 11 into the reaction volume 7, is positioned on the optical axis 15, on the side opposite, relative to the reaction volume 7, from the radiator 4. The concave reflector 16 is positioned concentrically relative to the optical radiation-flow axis 15 of the radiator 4, which radiation in turn passes through the reaction volume 7. The presence of the concave reflector 16 is optional.

According to one other embodiment of the invention, the radiator 4 has a tank filled with a radiator heated medium 5 which contains a medium with the same chemical composition as the gas medium 3 supplied to the reaction vacuum chamber 2. Furthermore, the reaction volume 7 is at least partially positioned in the zone of optical visibility of the radiator heated medium 5. This embodiment of the invention corresponds to the embodiment depicted in FIG. 2, with the exception of the optical filter 12, the presence of which is not anticipated by this embodiment of the invention (not shown), since the radiator heated medium 5 has virtually the same emission spectral lines as the absorption spectral lines of the molecules of the gas medium 3. If water vapour is used as the gas medium 3 and the radiator heated medium 5, practically all the energy used to heat the water vapour in the tank of the radiator 4, for instance solar energy (not shown in FIG. 2), is radiated, in effect, at the same frequencies at which water vapour in the reaction vacuum chamber 2 absorbs energy most efficently. As a result of these resonance oscillations of molecules of water vapour, excited by the radiator 4, the water vapour undergoes dissociation in the vacuum chamber 2, into oxygen and hydrogen which are drawn off by the draw-off system 8 and subsequently separated into oxygen and hydrogen by the system 10 for separating the products of dissociation.

Alternatively, a medium, which has the same chemical composition as the gas medium 3 supplied to the reaction vacuum chamber 2, can be used as the radiator heated medium 5, said medium additionally containing an inert gas, for instance, argon.

Figure 3:
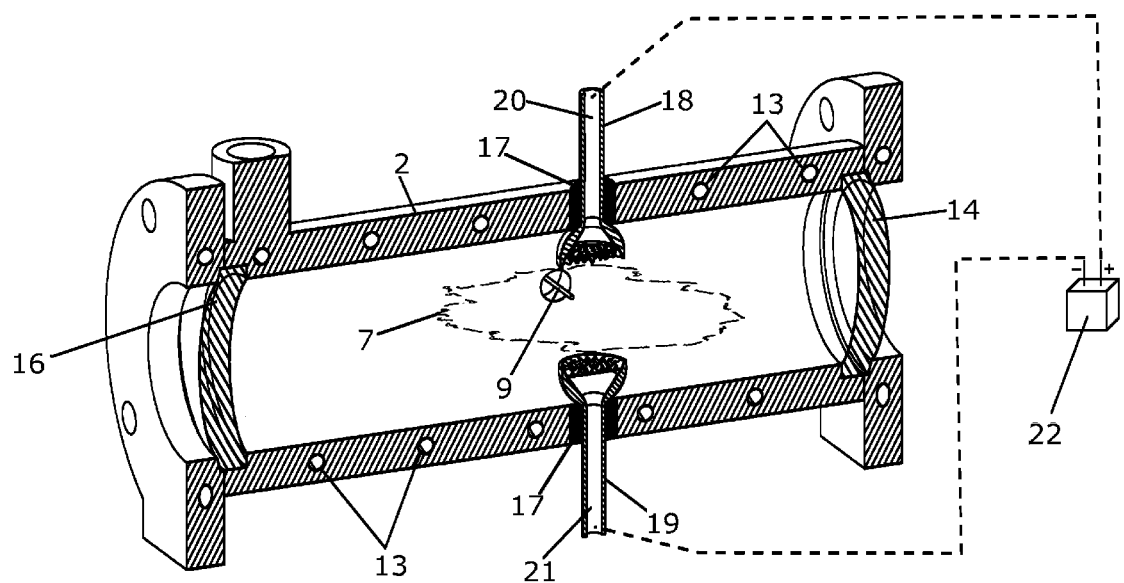
FIG. 3—schematic depiction of the cross section of the reaction vacuum chamber according to one of the embodiments of the claimed device, FIG. 4—schematic depiction of the cross section of a tubular electrode, FIG. 5—schematic depiction of the cross section of a tubular electrode containing a high-voltage electrode, FIG. 6—basic functional diagram of an alternative embodiment of the claimed device with identical composition of gas medium and radiator heated medium.

FIG. 3 is a schematic depiction of the cross section of the reaction vacuum chamber 2 according to one of the embodiments of the claimed device. For ease of interpretation, the radiator and the system for drawing off the products of dissociation of the gas medium are not shown. Unlike the chamber 2 depicted in FIG. 2, two hollow tubular electrodes 18 and 19 are provided in the central part of the cylindrical side wall of the chamber 2 and are positioned in the same transverse plane as the gas-medium inlet channel 9 and perpendicularly to said inlet channel, in diametrically opposing positions relative to each other, each of said hollow tubular electrodes being connected up to gas draw-off channels 20 and 21 respectively. The pressure in the gas draw-off channels 20 and 21 is maintained at a level which is lower than the pressure in the reaction vacuum chamber 2, in order to create corresponding flows for the drawing off of products of dissociation of the gas medium from the chamber 2. The preferred positioning of the end parts of the electrodes 18 and 19 in the chamber 2 is along either side of the reaction volume 7. The gas-medium inlet channel 9 is positioned in a plane which passes through the cross section of the chamber 2 and the centres of the end sections of the electrodes 18 and 19, in order to supply the gas medium to an area of the reaction volume 7 which is located between the electrodes. As a result, the gas medium 3 supplied from inlet channel 9, enters directly into the reaction volume 7, which is where dissociation of the molecules of the gas medium 3 takes place, and correspondingly separation and drawing off of the products of dissociation, along the tubular electrodes 18, 19. An electric isolator 17 (not shown) is positioned between the walls of the chamber 2 and each of the tubular electrodes 18, 19, wherein the first tubular electrode 18 is connected up to the positive terminal of a direct-current source 22, while the second tubular electrode 19 is connected up to the negative terminal of the direct-current source 22. The difference in charges of the electrodes 18 and 19 ensures electrostatic separation of the products of dissociation of the gas medium 3. If water vapour is used as the gas medium 3, then oxygen will be evacuated through the first tubular electrode 18 which is positively charged, while hydrogen will be evacuated through the second tubular electrode 19 which is negatively charged. Furthermore, the products of dissociation which form as a result of the dissociation process (charged ions) will transfer their charge to the correspondingly charged electrodes, making it possible, simultaneously with the dissociation process, to generate electrical energy at the electrodes. In FIG. 3, a concave reflector 16 is positioned in the left-hand end part of the chamber 2, while a focussing device 14 is positioned in the right-hand end part of the chamber 2, said focussing device being a converging lens made of a material which allows radiation from a radiator, within the claimed temperature range indicated above, to pass through. In order to cool the chamber 2, channels 13 are provided in the walls thereof, said channels carrying coolant in a spiral around the circumference of the walls of the chamber 2, for the purpose of cooling the chamber.

Figure 4:
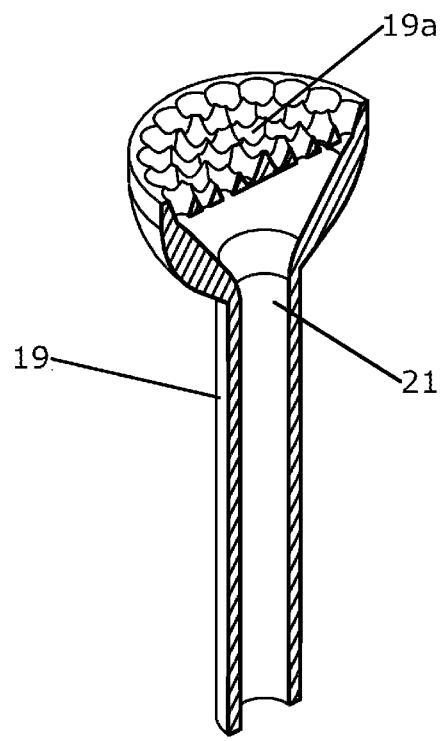

FIG. 4 is a schematic depiction of the cross section of the tubular electrode 19 with the gas draw-off channel 21 and the top end part of the electrode, which top end part is round in cross section and is positioned perpendicularly to the gas draw-off channel 21. The end surface of the end part of the electrode is provided with a plurality of holes 19a which become narrower towards the gas draw-off channel 21. This makes it possible, on the one hand, to significantly increase the area of the working surface of the electrode and, on the other hand, by virtue of pointed projections formed by the edge sections of the narrowing holes 19a, to provide a localised increase in electrical potential on the end part of the tubular electrode 19.

The other tubular electrode 18 (not shown) is of the same design. According to this embodiment of the invention, both systems for drawing off and separating the products of dissociation of a gas medium are in the form of the hollow tubular electrodes described above.

Figure 5:
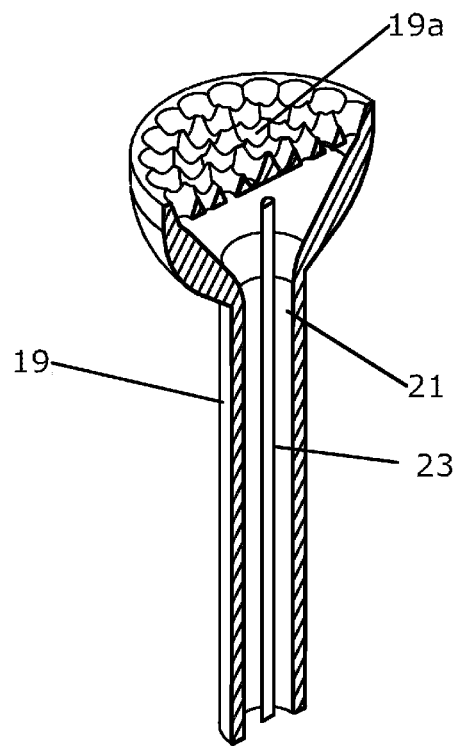

FIG. 5 is a schematic depiction of an alternative embodiment of the electrode 19 containing a gas draw-off channel 21. According to this embodiment, unlike the embodiment depicted in FIG. 4, an additional cylindrical electrode is fitted in the gas draw-off channel 21, coaxially to same, and with a gap relative to the inside of the end surface of the end part of the electrode 19, said additional cylindrical electrode forming a high-voltage electrode 23 which is designed to be electrically isolated from the electrode 19 itself. While the tubular electrode 19 is itself connected up to a direct-current source 22 (not shown), the high-voltage electrode 23 of same is connected up to a high-voltage source of same-polarity voltage (not shown), which makes it possible to increase the efficiency of electrostatic separation of the products of dissociation of the gas medium.

Figure 6:
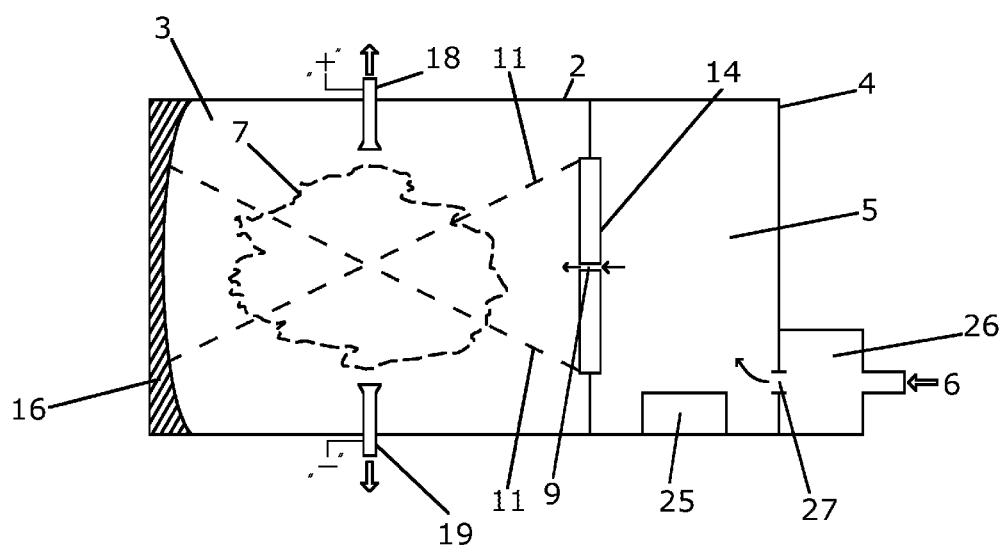

FIG. 6 is a basic functional diagram illustrating the operation of an alternative embodiment of the claimed device, wherein the compositions of the gas medium 3 and the radiator heated medium 5 are the same. According to this embodiment, the reaction vacuum chamber depicted in FIG. 3 can be used, in which reaction vacuum chamber, however, the gas-medium inlet channel 9 is not positioned in the side wall of the housing of the chamber 2, as is shown in FIG. 3. Instead, the inlet channel 9 is in the form of an opening in the focussing device 14 depicted in FIG. 3, said opening being 50 to 1000 μm in diameter. In said FIG. 3, the focussing device 14 is a part of the separating wall between the internal volume of the vacuum chamber 2 and the tank of the radiator 4. In this way, the radiator 4 abuts against the vacuum chamber 2. The focussing device 14 is in the form of a converging lens made of sapphire or calcium fluoride, which allows radiation to pass through in the range 350° C. to 1500° C.

Alternatively, as indicated in FIG. 6, in place of the focussing device 14, it is possible to use the optical filter 12 which also allows radiation from the gas medium, heated in the tank of the radiator 4 in the aforementioned temperature range, to pass through. A device 26 for pressurising the radiator heated medium 5, is connected up to the tank of the radiator 4 via a tank inlet port 27. The radiator heated medium 5, in this embodiment of the invention, is identical, in terms of its composition, to that of the gas medium 3 and is supplied to the pressurising device 26 in the form of a flow of a gas medium 6. The movement of the heated medium 5, from the pressurising device 26 into the heater and from the heater into the vacuum chamber 2, is notionally depicted by arrows in FIG. 6. A charge pump, or any other device capable of increasing pressure in the tank of the radiator 4, can be used as the pressurising device 26. The pressurising device 26 creates an elevated pressure in the tank of the radiator 4, in the range 2 to 100 bar. The gas medium, delivered under pressure into the tank of the radiator 4, is heated. Heating of the gas medium in the tank of the radiator 4 can be carried out, either by using a separate heating device 25, such as a high-frequency Hertzian radiator or an electric radiator, or alternatively, an external source of thermal energy, for instance high-temperature solid oxide fuel cells, including for the recycling of heat and water vapour emissions, can be used as the heating device, as well as solar radiation, thermal energy generated during the operation of an internal combustion engine, or when any process involving excess heat generation is being carried out.

In experiments conducted for the purpose of implementing the method, according to one of the embodiments of the claimed invention, a device corresponding to that depicted in FIG. 6, was used. The gas medium 5, in this case water vapour, was heated in the tank of the radiator 4 by the heating device 25, which is in the form of a heating coil made of nichrome, up to a temperature of 900° C. and pressure was maintained at a level of around 20 atmospheres. The thermal radiation of this gas medium, heated under pressure, passing through the focussing device (the focussing lens made of sapphire) 14, was concentrated in the reaction volume 7, and having been reflected off the concave, gold-coated and polished reflector 16, was once again focused into the reaction volume 7. Dissociation of water vapour was observed in the reaction volume, both with the reflector 16, and without said reflector, therefore the presence of the concave reflector 16 is optional. A 100-micron diameter opening in the focussing device was used as the inlet channel 9. As an alternative to the positioning of the gas-medium inlet channel 9 in the focussing device 14, as depicted in FIG. 6, the inlet channel 9 can be positioned in the separating wall, between the radiator 4 and the chamber 2, outside the focussing device 14 (not shown), or can be fed in through a tubular channel connecting the tank of the radiator 4 with the internal volume of the chamber 2, close to the reaction volume 7 (not shown). According to this embodiment of the claimed device, the flow 6 of gas medium, passing through the pressurising device 26, enters the tank of the radiator 4 at high pressure, and from there, via the inlet channel 9, into the inner cavity of the reaction vacuum chamber 2. Dissociation of the gas medium 3 takes place in the reaction volume 7, as a result of being subjected to radiation from the same gas medium, being however at a high pressure in the tank of the radiator 4. A prerequisite for implementing the process of dissociation of a gas medium is the positioning of the reaction volume 7 at least partially in the zone of optical visibility of the gas medium being heated in the tank of the radiator 4. The products of dissociation of the gas medium 3 are drawn off from the reaction volume through tubular electrodes 18 and 19, as represented in the embodiment depicted in FIG. 6.

REFERENCE DESIGNATIONS

1 Device for converting thermal energy into dissociation energy of molecules of a gas medium
2 reaction vacuum chamber
3 gas medium
4 radiator
5 radiator heated medium
6 flow of the gas medium 3
7 reaction volume
8 system for drawing-off the products of dissociation of the gas medium 3
9 inlet channel of the gas medium 3
10 system for separating the products of dissociation of the gas medium 3
11 radiation of the radiator 4
12 optical filter
13 system for cooling the reaction vacuum chamber
14 focusing device
15 radiation flow axis of the radiator 4
16 concave reflector
17 tubular electrode isolator
18 first tubular electrode
19 second tubular electrode
19a holes in the end part of the tubular electrode
20 gas draw-off channel of the first tubular electrode 18
21 gas draw-off channel of the second tubular electrode 19
22 source of direct-current voltage
23 high-voltage electrode
25 device for heating the heated medium 5
26 device for pressurising the radiator heated medium 5
27 inlet port of the tank of the radiator 4

The invention claimed is:

1. Method for converting thermal energy into dissociation energy of molecules of a gas medium comprising:
   A) supplying a first gas medium to a reaction vacuum chamber with a first window;
   B) supplying a second gas medium with the same composition as the first gas medium to a thermal radiation chamber, with a second window, thereby allowing an optical path between the first and second gas mediums;
   C) increasing the temperature of the second gas medium in the thermal radiation chamber in the range 350 to 1500° C., wherein the electromagnetic radiation emitted by the second gas medium corresponds to the spectral emissions lines of the second gas medium, which further correspond to the spectral absorption lines of the first gas medium, therein causing a dissociation reaction of the first gas medium; and
   D) drawing off dissociation products of the first gas medium.

2. Method according to claim 1, where the first and second gas medium is water vapor.

3. Method according to claim 1, where the first and second gas medium is carbon dioxide.

4. Method according to claim 1, according to which at stage D), when at least one product of dissociation is drawn off, at least one product of dissociation is separated out with the aid of hollow tubular electrodes, spatially separated from each other in the reaction vacuum chamber and connected to at least two gas draw-off channels which are at a lower pressure than the pressure in the reaction vacuum chamber, wherein a source of direct-current voltage, designed to maintain electrostatic separation of the products of dissociation of the first gas medium, is connected up to the hollow tubular electrodes.

5. Method for converting thermal energy into dissociation energy of molecules of a gas medium comprising:
   (a) supplying a first gas medium to a reaction vacuum chamber;
   (b) supplying a second gas medium with the same composition as the first gas medium to a thermal radiator chamber;
   (c) a shared optically transmissive material disposed between the reaction vacuum chamber and the thermal radiator chamber that creates an optical pathway between the reaction vacuum chamber and the thermal radiator chamber;
   (d) increasing the temperature of the second gas medium in the thermal radiation chamber, in the range of 350 to 1500° C., such that the second gas medium radiates electromagnetic energy, wherein the electromagnetic radiation emitted by the second gas medium correspond to the spectral emissions lines of the second gas medium and further correspond to the spectral absorption lines of the first gas medium, therein causing a dissociation reaction of the first gas medium; and
   (e) drawing off dissociation products of the first gas medium.

* * * * *